Sept. 19, 1939.  F. C. MENK  2,173,177
TRANSFERRING BULK MATERIAL
Filed Dec. 17, 1937  3 Sheets-Sheet 1
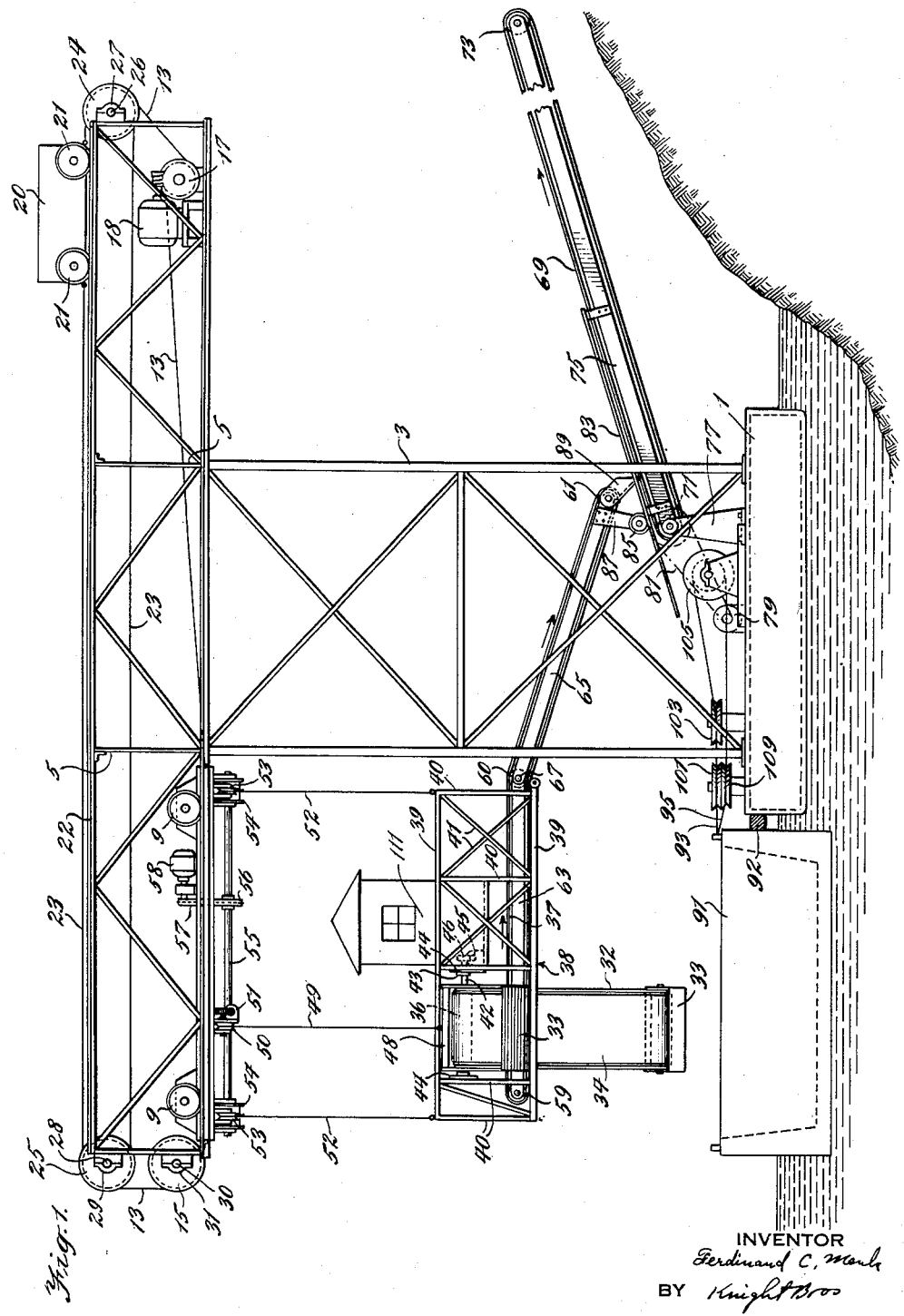
INVENTOR
Ferdinand C. Menk
BY Knight Bros
ATTORNEYS

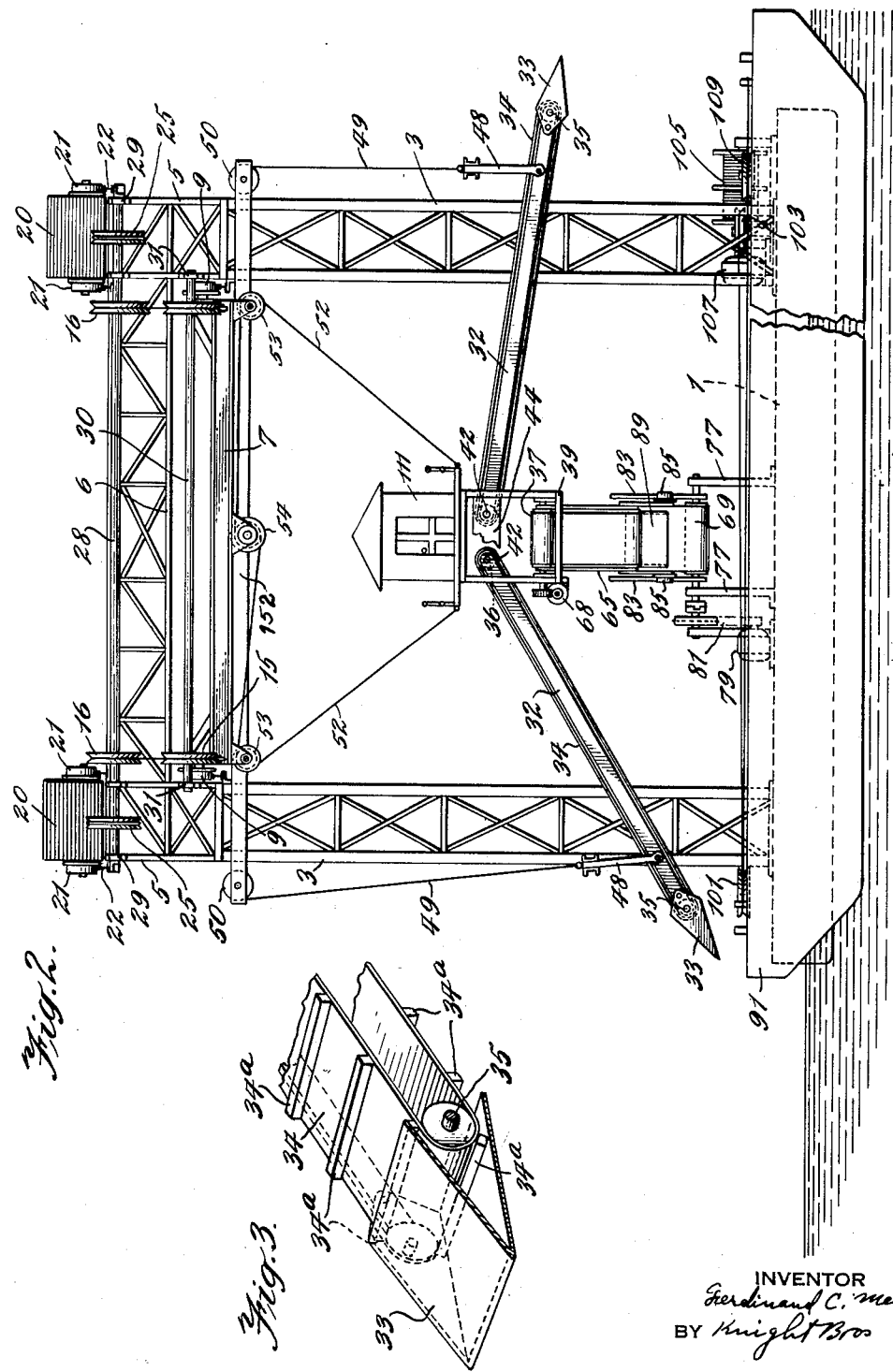

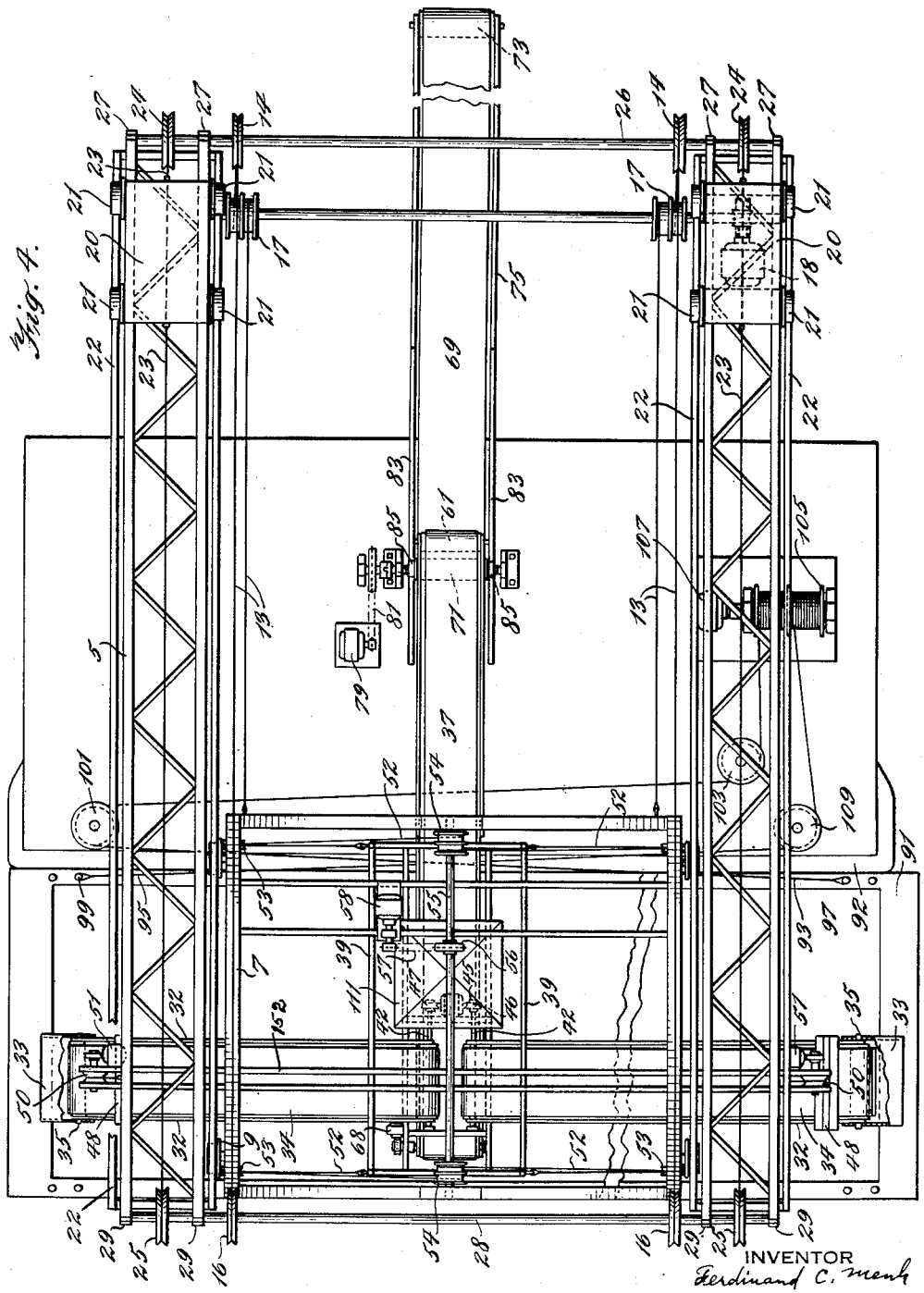

Patented Sept. 19, 1939

2,173,177

UNITED STATES PATENT OFFICE 2,173,177

TRANSFERRING BULK MATERIAL

Ferdinand C. Menk, Huntington, W. Va.

Application December 17, 1937, Serial No. 180,346

6 Claims. (Cl. 214—14)

This invention relates to a method and apparatus for transferring bulk material. Some features of the invention are particularly concerned with unloading barges containing coal or other bulk material.

The invention covers a machine characterized by a capacity to dig into a pile or load of bulk material, picking it up and conveying it in a substantially continuous stream to a point of delivery. Certain features of the machine safeguard it from shocks incident to digging into the pile of material to be transferred.

An important object of the invention is to provide a machine of this kind which combines cheapness and simplicity of construction with efficiency.

Another object is to provide a machine capable of systematically emptying a barge loaded with bulk material, with the assistance of very little if any hand work, and in such a way that the balance of the barge is maintained. The invention includes a process whereby a barge is unloaded without subjecting it to unbalanced stresses tending to strain it or to disturb its equilibrium.

Other objects will appear from the detailed description of one illustrative form of the invention shown in the accompanying drawings.

In the drawings

Fig. 1 is a side elevation of the machine;

Fig. 2 is a front elevation of the machine;

Fig. 3 is a detail perspective view, partly in section, of the digging end of the boom conveyor; and Fig. 4 is a plan view of the machine.

The illustrative machine shown in the drawings is designed for unloading barges of bulk material which is to be transferred to the shore. Upon a float 1 is built a super-structure comprising towers 3 topped by beams 5 which are tied together by crossbeams 6. The pickup end of the conveyor system is suspended from a bridge 7 having wheels 9 by which it travels upon tracks 11 on the beams 5. The bridge can be moved longitudinally of the beams by means of cables 13 guided over sheaves 14, 15, and 16 and wound upon winches 17 fixed to a shaft 17a which is rotated by a motor 18. The weight of the bridge 7 and its load is counterbalanced by counterweights 20 having wheels 21 rolling upon tracks 22. To the counterweights 20 are connected cables 23 guided over sheaves 24 and 25. Sheaves 14 and 24 are fixed upon a common shaft 26 mounted in bearings 27, so that rotation of sheave 14 by cable 13 rotates sheave 24 and shifts counterweight 20. Sheaves 16 and 25 are fixed upon a common shaft 28 mounted in bearings 29, while sheaves 15 are carried by a shaft 30 journalled in bearings 31.

In accordance with the purpose of maintaining the utmost simplicity, the pickup device comprises one, or a pair, of booms 32 provided at their lower ends with digging heads 33 and having mounted upon them belt conveyors 34 trained over rollers 35 and 36 at the opposite ends of the booms. In order to permit the use of a simple belt conveyor for taking the material away from the digging head 33 the material is discharged from the conveyor 34 as soon as it has travelled the length of the boom 32, onto the receiving end of a second conveyor 37. The conveyor 34 is preferably provided with cleats 34a to prevent the material from rolling or slipping back. The booms 32 are pivoted upon a support 38, shown in this case as a truss composed of beams 39, struts 40, and braces 41. The upper roller 36 of each conveyor 34 has a shaft 42 journalled in bearings 43 on plates 44 secured to struts 40. The shaft 42 may serve as the pivot for its boom, but is preferably covered by a sleeve (not shown) fixed to the boom 32 and journalled in the bearings 43, to take the weight of the boom off the constantly rotating shaft of the conveyor roller. The shafts 42 are driven by a motor 45 through worm and wheel gears 46, 47, which can be selectively coupled by clutches (not shown). The boom 32 is tilted on its pivot and supported at any desired inclination by an adjustable suspension comprising a yoke 48, cable 49, and pulley 50 driven by a motor 51. The sheaves 50 and motors 51 for the two booms are mounted upon opposite ends of a pair of beams 152 fixed to the bottom of the bridge 7.

The support 38 is suspended from the bridge by cables 52 trained over sheaves 53 onto winches 54. The winches 54 are fixed upon a shaft 55 bearing a fixed sprocket 56 driven through a chain 57 by a motor 58. This makes it possible to raise and lower the support so that the inclination of the boom 32, when set to dig into the material, can be sufficiently low to enable the material to be carried up by the conveyor 34 without slipping back.

The second conveyor 37 is guided by rollers 59, 60, and 61 mounted upon a two-section frame composed of bars 63 and 65 articulated at 67. The conveyor 37 is driven by a motor 68 and delivers to a third conveyor 69 trained over rollers 71 and 73 upon a frame 75. The left end of the frame 75 (Fig. 1) is supported upon posts 77 on the float 1, while the right-hand end of the frame extends out over the shore and is supported there by means not shown in the drawings. The roller 71 is driven by a motor 79 through a chain 81. Parallel to the conveyor 69 are tracks 83 upon which rest wheels 85 mounted by brackets 87 on the right-hand end of the frame 65 of the second conveyor. Upon movement of the bridge 7 in and out from the shore the right-hand end of the second conveyor is guided and supported by the tracks 83. A chute 89 delivers the material from the conveyor 37 to the conveyor 69.

The barge to be unloaded, shown at 91, is held alongside of the float 1 against a buffer 92 by lines 93 and 95 connected respectively to pins 97 and 99 of the barge. The line 93 is guided over sheaves 101 and 103 to a winch 105 driven by a motor 107. The line 95 is guided over a sheave 109 to the winch 105. The lines are oppositely wound on the winch so that when one is taken in the other is payed out. In this way the barge can be made to move longitudinally of its keel while being held against the float.

The various electric motors are controlled by switches located in the operator's cab 111 on the support 38. The motors whose duty is to raise and lower the boom, or the support, or to shift the bridge in and out, or to move the barge along the float, are controlled by reversing switches. The motors driving the conveyors run in one direction only.

The barge is unloaded by this machine in the following manner:—

Starting with the barge alongside the float 1 and with the left-hand digging head 33 (Fig. 2) located about amidships, the support 38 is lowered to rest the digging head upon the material loaded on the barge. The drive shaft 42 of the left-hand conveyor 34 is coupled to its driving motor and the upper span of the conveyor begins to move upward. The winch 105 is now operated to move the barge toward the right gradually. This causes the digging head to penetrate the upper layer of coal to a small depth controlled by the cable 49, raising the coal onto the conveyor 34. Since the support 38 is freely suspended by the cables 52 the digging head plows into the coal with a yielding pressure, avoiding all danger of overstressing the machine. The conveyor 34 is relieved of the digging pressure entirely by the digging head, its sole function being to receive the material guided onto it by the digging head and to convey it to the top of the boom 32. By the time the barge has moved far enough to bring the digging head 33 to the end of the barge, there has been removed from the load a layer of coal along a zone about equal to the width of the digging head, in one-half of the barge. The left-hand boom is now raised by operating its motor 51 and the barge is brought by winch 105 to a position such that the right-hand digging head 33 is over the point where the left-hand digging head began to dig. The right-hand boom is then lowered into digging position and the barge is moved gradually to the left by the winch 105. When the right-hand digging head 33 has reached the end of the barge it is raised by operating the motor 51 controlling the right-hand boom. Then the motor 18 is started to shift the bridge 7 to bring the conveyors over a different longitudinal zone of the barge. The operation is then repeated with the two conveyors working alternately. The bridge is positioned for each strip in such a way as to maintain the balance of the barge as nearly as possible. Finally the material can be cleaned up completely from the barge by simply running the digging heads over the bottom of the barge. The material falls from conveyors 34 onto the receiving end of conveyor 37, which carries it to the conveyor 69. The latter conveyor then transfers it to the shore. As the bridge moves in and out the wheels 85 of conveyor 37 ride upon tracks 83. The articulation of the two sections of the second conveyor at 67 allows the section 65 to tilt up and down as the bridge moves in and out.

I claim:

1. In a machine for unloading barges, a framework including a portion overhanging the water in which the barge is to lie while being unloaded, a support suspended from said overhanging portion, a boom mounted at one end on said support by a transverse horizontal pivot, means for holding a barge under said boom with its keel parallel to the longitudinal axis of the boom and for imparting to the barge a guided longitudinal movement, a belt conveyor mounted for longitudinal travel on said boom, means for tilting said boom about said pivot and for sustaining said boom at any desired inclination, a digging head on the end of said boom remote from said pivot, and means for moving said support horizontally in a direction transverse to the longitudinal axis of said boom.

2. In a machine for unloading barges, a framework including a portion overhanging the water in which the barge is to lie while being unloaded, a support, a cable suspension whereby said support is hung from said overhanging portion including means for taking up and paying out the cables to change the elevation of the support, a boom mounted at one end on said support by a transverse horizontal pivot, means for holding a barge under said boom with its keel parallel to the longitudinal axis of the boom and for imparting to the barge a guided longitudinal movement, a belt conveyor mounted for longitudinal travel on said boom, means for tilting said boom about said pivot and for sustaining said boom at any desired inclination, a digging head on the end of said boom remote from said pivot, and means for moving said support horizontally in a direction transverse to the longitudinal axis of said boom, the cables of said cable suspension being arranged yieldingly to resist a longitudinal thrust on said boom.

3. In a machine for unloading barges, a framework including a portion overhanging the water in which the barge is to lie while being unloaded, a support, a cable suspension whereby said support is hung from said overhanging portion including means for taking up and paying out the cables to change the elevation of the support, a boom mounted at one end on said support by a transverse horizontal pivot, means for holding a barge under said boom with its keel parallel to the longitudinal axis of the boom and for imparting to the barge a guided longitudinal movement, a belt conveyor mounted for longitudinal travel on said boom, means for tilting said boom about said pivot and for sustaining said boom at any desired inclination, a digging head on the end of said boom remote from said pivot, and means for moving said support horizontally in a direction transverse to the longitudinal axis of said boom, said cable suspension including at least four cables connected to spaced points on said support and diverging upwardly with reference to a vertical plane parallel to the horizontal pivot of said boom.

4. In a machine for transferring bulk material, a straight boom, transverse rollers at the two ends of said boom, means for driving one of said rollers, a belt conveyor trained over said rollers, a support upon which one end of said boom is mounted by a horizontal pivot, means for tilting said boom about said pivot and for sustaining said boom at any desired inclination, a digging head on the end of said boom remote from said pivot, a conveyor having its receiving end mounted on said support below the delivery end of said belt conveyor, and a cable suspension for said support including means for taking up and paying out the cables to change the elevation of the support, said cables being arranged yieldingly to resist a longitudinal thrust on said boom.

5. In a machine for transferring bulk material, a straight boom, transverse rollers at the two ends of said boom, means for driving one of said rollers, a belt conveyor trained over said rollers, a support upon which one end of said boom is mounted by a horizontal pivot, means for tilting said boom about said pivot and for sustaining said boom at any desired inclination, a digging head on the end of said boom remote from said pivot, a conveyor having its receiving end mounted on said support below the delivery end of said belt conveyor, and a cable suspension for said support including at least four cables connected to spaced points on said support and diverging upwardly with reference to a vertical plane parallel to the horizontal pivot of said boom and means for taking up and paying out said cables to change the elevation of said support.

6. The method of unloading a barge holding bulk material, which comprises moving the barge under a digging conveyor in a fore-and-aft direction, thereby skimming strips of the material from the surface of the load in a direction parallel to the keel of the barge, and moving the conveyor laterally after each strip is skimmed, so that successive strips are taken from different parts of the load to maintain the balance of the barge.

FERDINAND C. MENK.